(12) United States Patent
Otomo et al.

(10) Patent No.: US 6,950,262 B2
(45) Date of Patent: Sep. 27, 2005

(54) FLEXIBLE DISK DRIVE CONTROL METHOD CAPABLE OF PREVENTING A SEEK ERROR FROM OCCURRING

(75) Inventors: Yoshihto Otomo, Tendo (JP); Masumi Kawagoe, Tendo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/247,390

(22) Filed: Sep. 19, 2002

(65) Prior Publication Data

US 2003/0063409 A1 Apr. 3, 2003

(30) Foreign Application Priority Data

Oct. 2, 2001 (JP) .................................... 2001/306503

(51) Int. Cl.$^7$ ................ G11B 15/18; G11B 17/00; G11B 19/02
(52) U.S. Cl. .................. 360/69; 360/73.03; 360/78.13
(58) Field of Search ................ 360/69, 73.03, 360/75, 78.04, 78.13, 70, 71, 72.1, 77.01, 7.02, 77.03, 78.01

(56) References Cited

U.S. PATENT DOCUMENTS

| 4,551,777 A | * 11/1985 | Saito et al. ............ 360/77.11 |
| 4,658,307 A | 4/1987 | Tsuyuguchi et al. |
| 4,783,706 A | 11/1988 | Shoji et al. |
| 4,969,059 A | * 11/1990 | Volz et al. ............. 360/78.04 |
| 5,357,384 A | * 10/1994 | Tsuyuguchi et al. .......... 360/75 |
| 5,612,835 A | * 3/1997 | Shirota et al. ........... 360/78.14 |
| 6,574,069 B1 | 6/2003 | Otomo et al. |

FOREIGN PATENT DOCUMENTS

| JP | 63-9088 A | 1/1988 |
| JP | 09-091859 A | 4/1997 |
| JP | 09-097493 A | 4/1997 |
| JP | 09-097839 A | 4/1997 |
| JP | 2001-35070 A | 2/2001 |

* cited by examiner

Primary Examiner—David Hudspeth
Assistant Examiner—Jason Olson
(74) Attorney, Agent, or Firm—Frishauf, Holtz, Goodman & Chick, P.C.

(57) ABSTRACT

In a flexible disk drive for driving a flexible disk inserted in the flexible disk drive, when a power supply is turned on and when the flexible disk is not inserted in the flexible disk drive, a seek operation is inhibited and a track 00 signal is supplied to a host system just as if the flexible disk drive were operating normally.

4 Claims, 10 Drawing Sheets

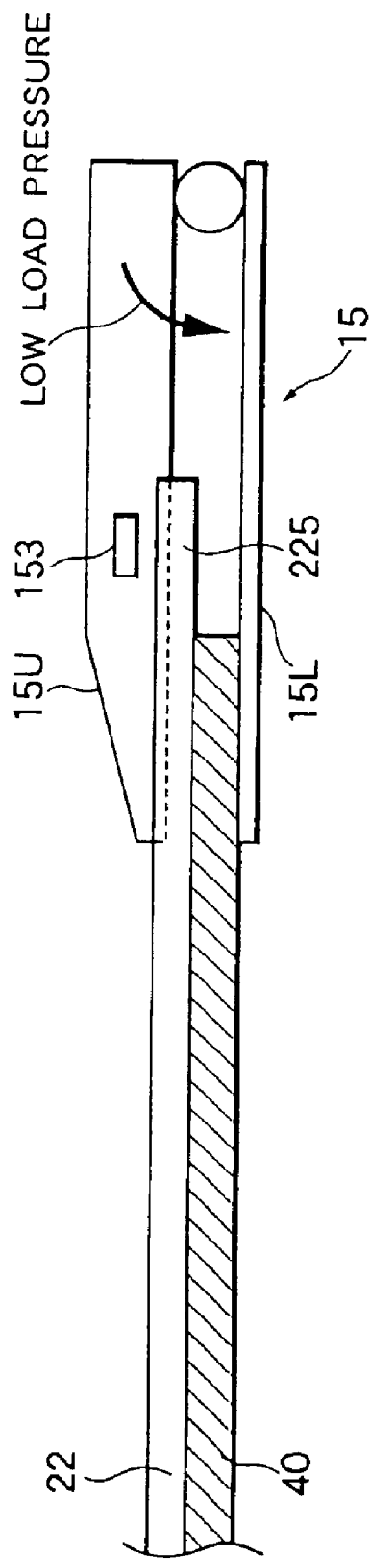
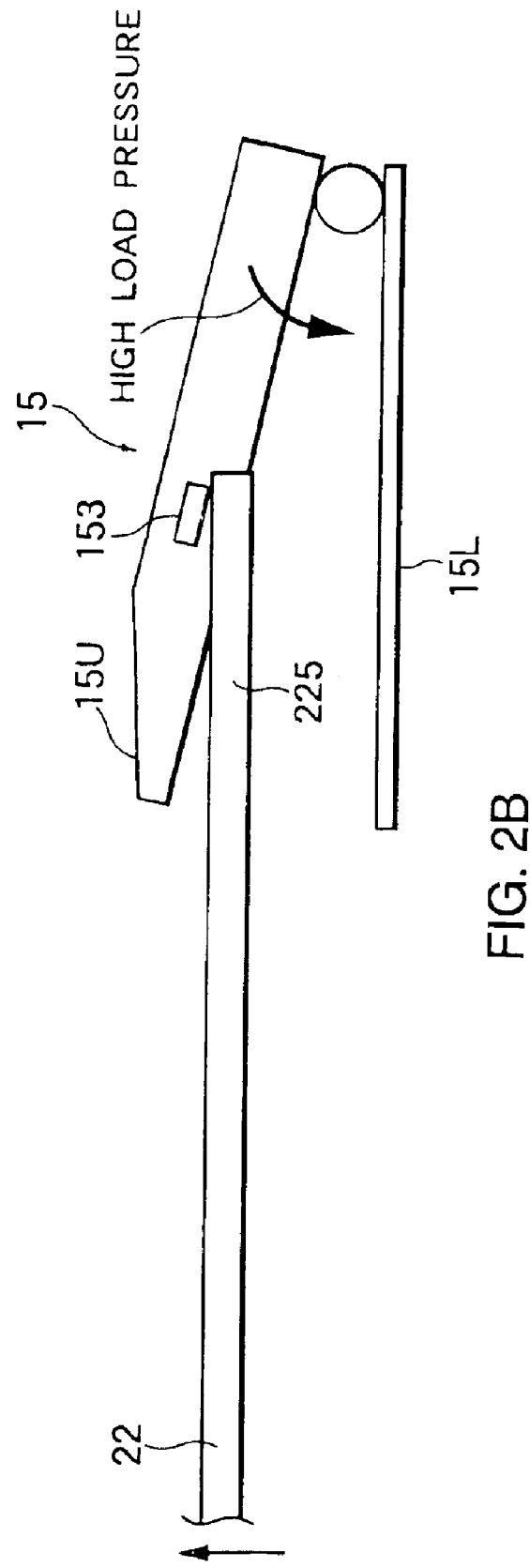
FIG. 2A
FIG. 2B

FLEXIBLE DISK DRIVE CONTROL METHOD CAPABLE OF PREVENTING A SEEK ERROR FROM OCCURRING

BACKGROUND OF THE INVENTION

This invention relates to a flexible disk drive control method for controlling a flexible disk drive.

In the manner known in the art, the flexible disk drive (which may be called "FDD" for short) of the type is a device for carrying out data recording and reproducing operation to and from a magnetic recording medium of a flexible disk (which may be called "FD" for short) loaded therein. In addition, such a flexible disk drive is loaded in an electronic equipment such as a laptop personal computer, a notebook-size personal computer, a notebook-size word processor, or the like. The electronic equipment is called a host system.

The flexible disk drive of the type comprises magnetic heads for reading/writing data from/to the magnetic recording medium of the flexible disk, a carriage assembly for supporting the magnetic head at a tip thereof with the magnetic head movably along a predetermined radial direction to the flexible disk, a stepping motor for moving the carriage assembly along the predetermined radial direction, and a spindle motor for rotatably driving the magnetic recording medium with the flexible disk held. An operation to move the magnetic heads to a target track is called a "seek" operation in the art. This seek operation is carried out by rotating the stepping motor.

In order to control such a flexible disk drive, an FDD control apparatus is already proposed. By way of example, Japanese Unexamined Patent Publication Tokkai No. Hei 9-97,493 (97,493/1997) discloses, as the FDD control apparatus, one integrated circuit (IC) chip which incorporates first through third control circuits therein. The first control circuit is a reading/writing (hereinafter called "R/W") control circuit for controlling reading/writing of data. The second control circuit is a stepping motor (hereinafter called "STP") control circuit for controlling drive of the stepping motor. The third control circuit is a general controlling (hereinafter called "CTL") control circuit for controlling whole operation of the flexible disk drive. This IC chip is generally implemented by a metal oxide semiconductor (MOS) IC chip where a number of MOS field effect transistors (FETs) are integrated therein.

The FDD control apparatus comprises not only the one IC chip but also a spindle motor IC chip for controlling drive of the spindle motor. The spindle motor IC chip is implemented by a bipolar IC chip where a number of bipolar transistors are integrated therein.

Now, flexible disk drives have different specifications due to customers or users. The specification defines, for example, drive select 0 or drive select 1, the presence or absence of a special seek function, the presence or absence of an automatic chucking function, a difference of logic for a density out signal, a difference of logic for a mode select signal, 1M mode 250 kbps or 300 kbps, and so on. If development is made of one IC chips which individually satisfy the different specification, a number types of one IC chips must be prepared. In order to avoid this, a one IC chip having a selectable function circuit is already proposed, for example, in Japanese Unexamined Patent Publication Tokkai No. Hei 9-97,839 (97,839/1997) wherein all functions satisfying all specifications are preliminarily incorporated therein and one of the functions is selected in accordance with a particular specification.

As is well known in the art, the flexible disk driven by the flexible disk drive includes a disk-shaped magnetic recording medium accessed by the magnetic head. The magnetic recording medium has a plurality of tracks on a surface thereof that serve as paths for recording data and that are formed in a concentric circle along a radial direction. The flexible disk has eighty tracks on side which include the most outer circumference track (which is named "TR00 ") and the most inner circumference track (which is named "TR79"). The most outer circumference track TR00 is herein called the most end track.

It is necessary to position the magnetic head at a desired track position in a case where the flexible disk is accessed by the magnetic heads in the flexible disk drive. For this purpose, the carriage assembly for supporting the magnetic head at the tip thereof must be positioned. Inasmuch as the stepping motor is used as a driving arrangement for driving the carriage assembly, it is possible to easily carry out the positioning of the carriage assembly. In spite of this, it is necessary for the flexile disk drive to detect only the position of the most end track TR00 in the magnetic recording medium of the flexible disk loaded therein. In order to detect the position of the most end track TR00, the carriage assembly is provided with an interception plate which projects from a base section thereof downwards and a photointerrupter is mounted on a substrate in the vicinity of a main frame opposed to the carriage assembly. For example, see Japanese Unexamined Patent Publication Tokkai No. Hei 9-91,859 (91,859/1997). That is, it is possible to detect that the magnetic head is laid in the position of the most end track TR00 in the magnetic recoding medium of the flexible disk because the interception plate intercepts an optical path in the photointerrupter. Such a track position detecting mechanism is called a "00 sensor" in the art.

An FDD control apparatus is an apparatus for controlling the flexible disk drive. A conventional FDD control apparatus seeks the magnetic heads in a direction (for example, an inner periphery or an outer periphery) designated by an external seek direction signal when a drive select signal is put into an active state of a logic low level and when an external step signal is inputted whether or not the flexible disk is laid (inserted) in the flexible disk drive. At any rate, the conventional FDD control apparatus can carry out the seek operation in spite of insertion/noninsertion of the flexible disk.

However, in a case where the flexible disk is not inserted in the flexible disk drive, the conventional FDD control apparatus is disadvantageous in that a seek error occurs and seek noises are raised in the manner which will later be described in conjunction with FIGS. 2A and 2B.

SUMMARY OF THE INVENTION

It is therefore an object of the present invention to provide a flexible disk drive control method which is capable of preventing occurrence of a seek error.

It is another object of the present invention to provide a flexible disk drive control method of the type described, which is capable of suppressing seek noises on absence of a media.

Other objects of this invention will become clear as the description proceeds.

On describing the gist of this invention, it is possible to be understood that a flexible disk drive control method controls a flexible disk drive for driving a flexible disk inserted in the flexible disk drive.

According to a first aspect of this invention, the above-understood flexible disk drive control method comprises the steps of prohibiting a seek operation when a power supply is turned on and when the flexible disk drive is not inserted in the flexible disk drive and of supplying a track 00 signal to a host system just as if the flexible disk drive normally operate.

According to a second aspect of this invention, the above-understood flexible disk drive control method comprises the steps of making both of a current position counted value of a head current position track counter and a target position counted value of a head target position track counter zero when a power supply is turned on and of supplying a host system with a track 00 signal indicating that magnetic heads are laid on a most end track position.

In the above-mentioned flexible disk drive control method according to the second aspect of this invention, when a step signal is not supplied from the host system and when the flexible disk is not inserted in the flexible disk drive, a special seek operation is prohibited. When the step signal is not supplied from the host system and when the flexible disk is inserted in the flexible disk drive, the special seek operation is carried out.

When the step signal is supplied to the host system and when the flexible disk is not inserted in the flexible disk drive, the special seek operation is prohibited, the head target position track counter operates in response to the step signal although the magnetic heads are not actually operated, and the host system is supplied with the track 00 signal indicating that the magnetic heads are not laid on the most end track position. When the step signal is supplied to the host system and when the flexible disk is inserted in the flexible disk drive, the special seek operation is carried out, the magnetic heads are automatically sought so that the current position counted value of the head current position track counter makes equal to the target position counted value of the head target position track counter, the host system is supplied with the track 00 signal indicating that the magnetic heads are not laid on the most end track position.

When the step signal is supplied from the host system after the special seek operation and when the flexible disk is inserted in the flexible disk drive, a seek operation is carried out. When the step signal is supplied from the host system after the special seek operation and when the flexible disk is inserted in the flexible disk drive, the seek operation is prohibited until the flexible disk is inserted in the flexible disk drive, the head target position track counter operates in response to the step signal although the magnetic heads are actually not operated, and the magnetic heads are automatically sought so that the current position counted value of the head current position track counter makes equal to the target position counted value of the head target position track counter when the flexible disk is inserted in the flexible disk drive.

BRIEF DESCRIPTION OF THE DRAWING

FIG. 2A and 2B are schematic views for use in describing seek operation in a state where a flexible disk is not inserted in a flexible disk drive;

DETAILED DESCRIPTION OF THE DRAWINGS

Figure 1:
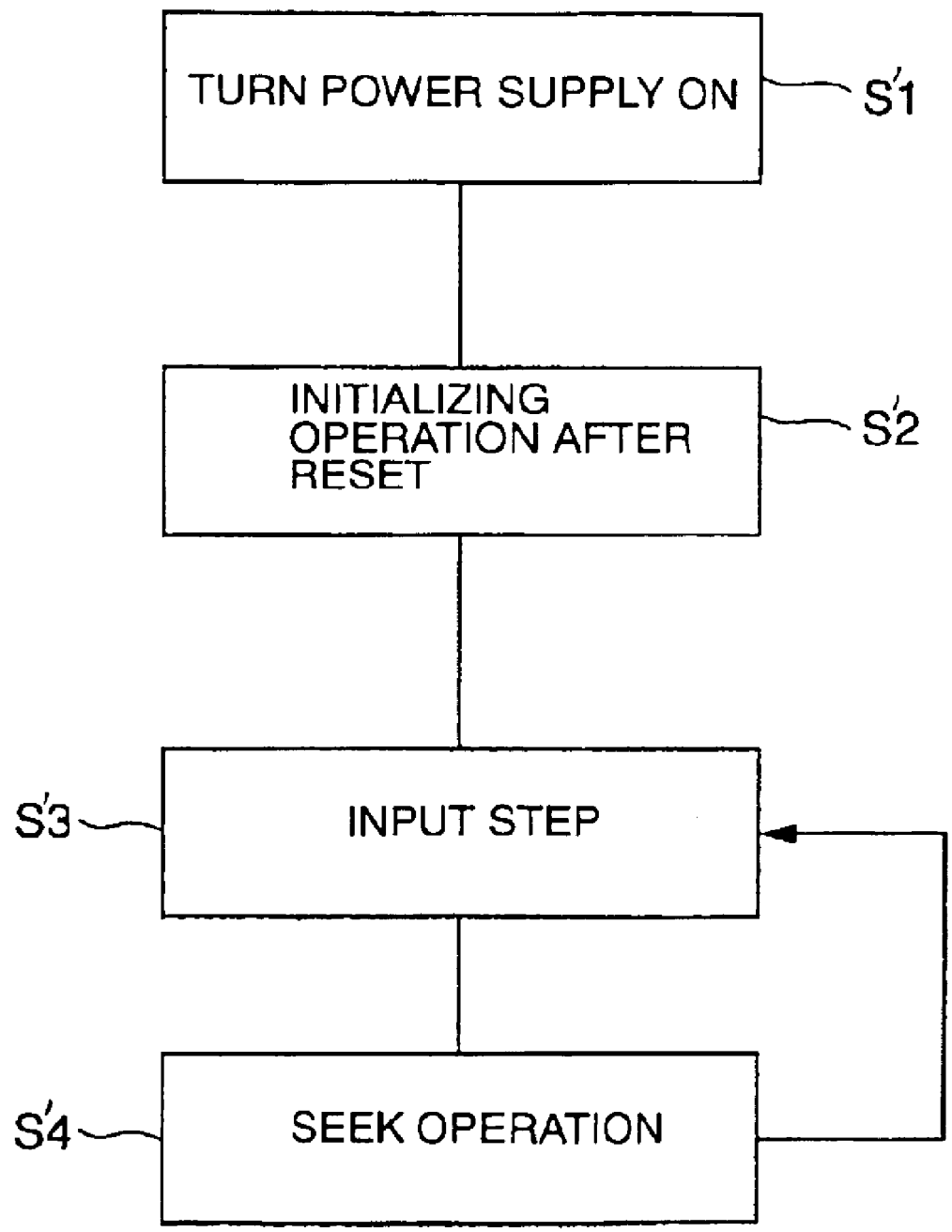
FIG. 1 is a flow chart for use in describing a conventional FDD control method.

Referring to FIG. 1, description will proceed to a conventional FDD control method at first in order to facilitate an understanding of the present invention. FIG. 1 is a flow chart for use in describing the conventional FDD control method.

When a power supply is turned on (step S'1), the FDD control apparatus is put into an operation state. After the FDD control apparatus carries out a reset operation whether a flexible disk is present (inserted) in a flexible disk drive or is absent (not inserted) in the flexible disk drive, a host system carries out an initializing operation for the FDD control apparatus (step S'2). The initializing operation is an operation comprising the steps of making magnetic heads seek toward inside of the flexible disk by 41 tracks or more and of making the magnetic heads seek toward outside of the flexible disk by the same tracks. In the initializing operation, the FDD control apparatus recognizes a track position detected signal from the above-mentioned 00 sensor. When the track position detected signal indicates a position of a most end track TR00, the FDD control apparatus sends a track 00 signal to the host system. When the host system receives the track 00 signal at an expected timing, the host system recognizes that the flexible disk is normally loaded in the flexible disk drive. Otherwise, the host system recognizes that there is trouble or the like in the flexible disk drive and an error occurs. Thereafter, responsive to an external step signal from the host system (step S'3), the FDD control apparatus carries out a seek operation (step S'4).

At any rate, the conventional FDD control method can carry out the seek operation in spite of insertion/noninsertion of the flexible disk.

However, in a case where the flexible disk is not inserted in the flexible disk drive, malfunctions occur in the conventional FDD control method in the manner which will presently be described.

Referring now to FIGS. 2A and 2B, description will proceed to the malfunctions. FIG. 2A shows a state where the flexible disk is loaded in the flexible disk drive while FIG. 2B shows a state where the flexible disk is not loaded in the flexible disk drive.

As illustrated in FIG. 2A, when the flexible disk depicted at 40 is loaded in the flexible disk drive, a disk holder 22 falls down an side arms 153 attached to an upper carriage 15U of a carriage assembly 15 are not engaged with a swelled portion 225 of the disk holder 22. In this event, a magnetic recording medium (not shown) of the flexible disk 40 is put between a pair of magnetic heads (not shown). Accordingly, it is possible to sufficiently drive the carriage assembly 15 using the stepping motor having the low torgue. This is because the magnetic heads are pressed against the magnetic recording medium with a low spring pressure (which is called a load pressure) and a low load is applied to the carriage assembly 15.

It will be assumed that the flexible disk 40 is not loaded in the flexible disk drive as illustrated in FIG. 2B. Under the circumstances, the disk holder 22 moves upward in the manner depicted at an arrow and the disk holder 22 lifts up the upper carriage 15U of the carriage assembly 15. That is, the side arms 153 attached to the upper carriage 15U of the carriage assembly 15 are engaged with the swelled portion 225 of the disk holder 22. Accordingly, the load with a high load pressure is applied to the carriage assembly 15. As a result, the stepping motor for the driving the carriage assembly 15 is required to ensure a higher torque than that in a case where the flexible disk 40 is loaded in the flexible disk drive as illustrated in FIG. 2A.

Accordingly, a first malfunction in the conventional FDD control method is that a seek error may occur due to a large load caused by friction between the side arms 153 and the disk holder 22, as mentioned in the preamble for the instant specification. A second malfunction in the conventional FDD control method is that seek noises on "absence of a medium", namely, in a state where the flexible disk 40 is not loaded in the flexible disk drive as illustrated in FIG. 2B are raised in comparison with seek noises on "presence of the medium", namely, in a state where the flexible disk 40 is loaded in the flexible disk drive as illustrated in FIG. 2A, as mentioned also in the preamble of the instant specification.

Figure 3:
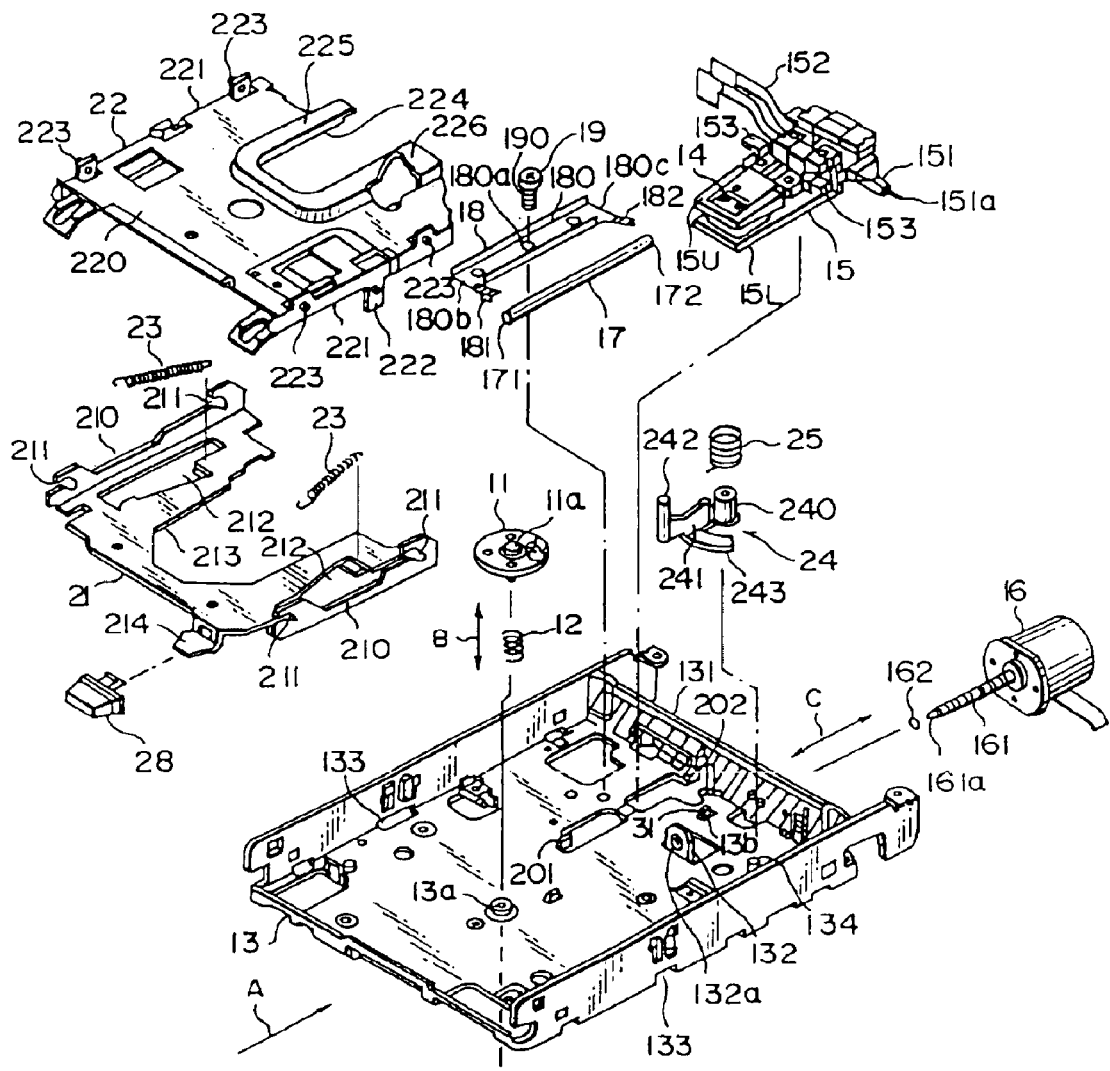
FIG. 3 is an exploded perspective view showing a main part of a flexible disk drive to which an FDD control method according to this invention is applicable.
Figure 4:
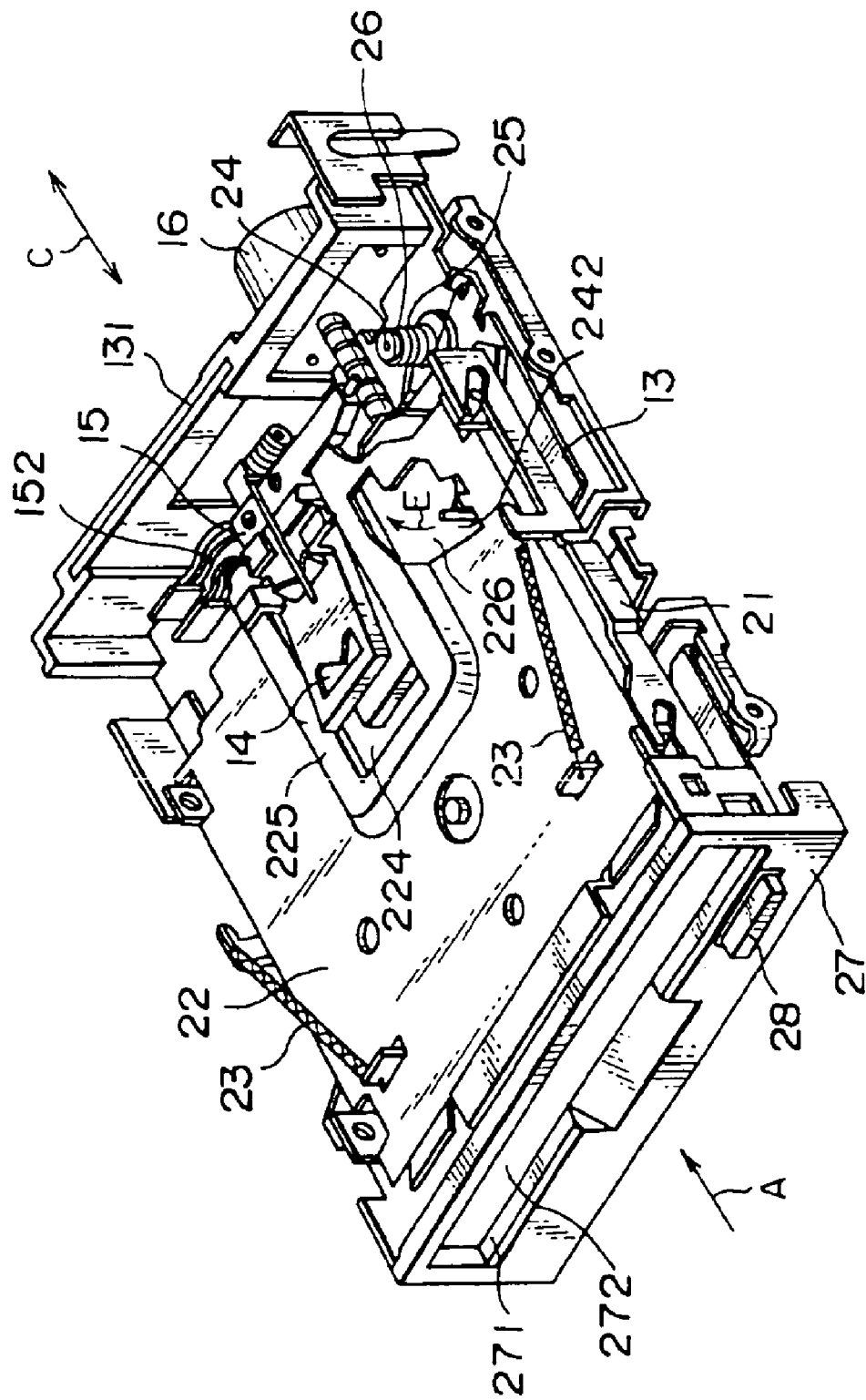
FIG. 4 is a schematic perspective view of the flexible disk drive illustrated in FIG. 3 as view from front obliquely.

Referring to FIGS. 3 and 4, the description will proceed to a flexible disk drive of a 3.5-inch type which is enable to be loaded in a portable electronic equipment and to which an FDD control method according to this invention is applicable. FIG. 3 is an exploded perspective view of the flexible disk drive and FIG. 4 is a perspective view of the flexible disk drive viewing from a front side.

The illustrated flexible disk drive is a device for driving a flexible disk of a 3.5-inch type (which will later be described). The flexible disk is loaded in the flexible disk drive from a direction indicated by an arrow A in FIGS. 3 and 4. The loaded flexible disk is held on a disk table 11 having a rotation axis 11a. In this event, the rotation axis 11a coincides with a center axis of the flexible disk. The rotation axis 11a of the disk table 11 is inserted in a baring 13a formed on a main frame 13 via a spring 12 and therefore the disk table 11 is rotatably supported on a main surface of the main frame 13. Accordingly, the rotation axis 11a of the disk table 11 has an axial direction B which extends in parallel with a thick direction of the main frame 13. The disk table 11 is rotatably driven by a spindle motor (not shown), which is mounted on a back surface of the main frame 13, thereby a magnetic recording medium of the flexible disk rotates. In addition, on the back surface of the main frame is attached a main printed substrate (which will later become clear) on which a number of electronic parts (not shown) are mounted.

The flexible disk drive comprises a pair of upper and lower magnetic heads 14 (only the upper magnetic head is illustrated) for reading/writing data from/to the magnetic recording medium of the flexible disk. The magnetic heads 14 are supported in a carriage assembly 15 at a tip thereof that is laid in the flexible disk drive at a rear side. That is, the carriage assembly 15 comprises an upper carriage 15U for supporting the upper magnetic head 14 and a lower carriage 15L for supporting the lower magnetic head. The carriage assembly 15 is disposed over the main surface of the main frame 13 and is apart from the main frame 13 in the manner which will later be described. The carriage assembly 15 supports the magnetic heads 14 movably along a predetermined radial direction (i.e. a direction indicated by an arrow C in FIGS. 3 and 4) to the flexible disk.

In addition, the main frame 13 has at the rear side a side wall 131 on which a stepping motor 16 is fixed. The stepping motor 16 linearly drives the carriage assembly 15 along the predetermined radial direction C. More specifically, the stepping motor 16 has an axis of rotation (a driving shaft) 161 which extends in parallel with the predetermined radial direction C and which is threaded to form a male screw. The driving shaft 161 has a tip 161a which penetrates a hole 132a bored in a bent piece 132 and which is provided with a steel ball 162. The bent piece 132 is raised from the main surface of the main frame 13 by cutting and bending. By the hole 132a and the steel ball 152, a position of the driving shaft 161 is defined so as to extend in parallel with the predetermined radial direction C and the tip 161a is rotatably held.

On the other hand, the carriage assembly 15 comprises an arm 151 which extends from the lower carriage 15L to the driving shaft 161. The arm 151 has a leading edge 151a which is bent so as engage with the root in the male screw of the driving shaft 161. Therefore, when the driving shaft 161 of the stepping motor 16 rotates, the leading edge 151a of the arm 151 moves along the root in the male screw of the driving shaft 161, thereby moving the carriage assembly 15 along the predetermined radial direction C. At any rate, the stepping motor 16 serves as a driving arrangement for moving the carriage assembly 15 along the predetermined radial direction C.

Inasmuch as the driving shaft 161 of the stepping motor 16 is disposed at one side of the carriage assembly 15, the one side of the carriage assembly 15 is movably supported by the driving shaft 161 and is apart from the main surface of the main frame 13. However, because support occurs by the driving shaft 161, it is difficult to dispose the whole of the carriage assembly 15 apart from the main surface of the frame 13. For this purpose, it is necessary to support and guide the carriage assembly 15 at another side thereof. To guide the carriage assembly 15 is a guide bar 17. That is, the guide bar 17 is opposed to the driving shaft 161 of the stepping motor 16 with the carriage assembly 15 inserted between the guide bar 17 and the driving shaft 161. The guide bar 17 extends in parallel with the predetermined radial direction C and has one end 171 and another end 172 which are mounted on the main surface of the main frame 13 in the manner which later be described. The guide bar 17 guides the carriage assembly 15 along the predetermined radial direction C. As a result, the whole of the carriage assembly 15 is disposed from the main surface of the main frame 13.

In addition, a flexible printed circuit (FPC) 152 extends from the carriage assembly 15 to the vicinity of the guide bar 17 and the flexible printed circuit 152 are electrically connected to the main printed substrate attached to the back surface of the main frame 13.

The guide bar 17 is clamped on the main surface of the main frame 13 by a guide bar clamp 18. The guide bar clamp 18 is fixed on the main surface of the main frame 13 at a center portion thereof by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft 190 of the binding small screw 19 passes. The rectangular fixed member 180 has one end 180b and another end 180c from which a pair of arms 181 and 182 extend to clamp the one end 171 and the other end 172 of the guide bar 17 which the guide bar 17 sandwiched between the arms 181 and 182, respectively.

Inasmuch as the guide bar clamp 18 merely clamps the guide bar 17, the guide bar 17 is not mounted on the main surface of the main frame 13 by the guide bar clamp 18 alone. For this purpose, a pair of locating members for locating the both ends 171 and 172 of the guide bar 17 is needed. As the pair of locating members, a pair of bent pieces 201 and 202 is used which are formed by cutting and bending parts of the main frame 13. At any rate, the pair of bent pieces 201 and 202 locates both ends 171 and 172 of the guide bar 17 to mount the guide bar 17 on the main surface of the main frame 13 in cooperation with the guide bar clamp 18.

The lower carriage 15L of the carriage assembly 15 serves as a supporting frame for supporting the carriage assembly 15 slidably along the guide bar 17. The lower carriage 15L has a projecting portion (not shown) which projects into the main surface of the main frame 13 at a side of the guide bar 17. The guide bar 17 is slidably fitted in the projection portion.

The flexible disk drive further comprises an eject plate 21 and a disk holder 22. Each of the main frame 13, the eject plate 21, and the disk holder 22 is formed to perform bending, press working, and bending of a metal plate.

The eject plate 21 is mounted on the main surface of the main frame 13 slidably along the insertion direction A of the flexible disk and an opposite direction. In the manner which will later become clear, the eject plate 21 holds, in cooperation with the disk holder 22, the flexible disk on operating of the flexible disk drive. In addition, the eject plate 21 holds the flexible disk slidably along in the insertion direction A so as to allow the flexible disk drive to load the flexible disk therein along the insertion direction A and to allow the flexible disk drive to eject the flexible disk therefrom along the opposite direction. The eject plate 21 comprises a pair of side walls 210 which are opposed to each other. Each of the side walls 210 has a pair of cam portions 211. In addition, the eject plate 21 has a bottom surface on which cut portions 212 are formed along the both side walls 210 and a U-shaped cut portion 213 is formed at a center portion thereof so as to enclose the disk table 11. Furthermore, the eject plate 21 has a back surface on which a pin (not shown) is formed. The pin engages with a stop part of an eject lever which will later be described.

The disk holder 22 is disposed on the eject plate 21. The disk holder 22 comprises a principal surface 220 and a pair of side walls 221 which is formed at both side ends of the principal surface 220 and which is opposed to each other. The both side walls 221 have projection pieces 222 (only one is illustrated). The projection pieces 222 are inserted in bores 133 of the main frame 13 through the cut portions 212 of the eject plate 21. Inasmuch as the projection pieces 222 are inserted in the bores 133 of the main frame 13, the disk holder 22 is positioned against the main frame 13 in the insertion direction A and the disk holder 22 is reciprocated in the axial direction B of the rotation axis 11a of the disk table 11. Each of the both side walls 221 has a pair of pins 223. The pins 223 are inserted in the cam portions 211 formed in the side walls 210 of the eject plate 21. Between the disk holder 22 and the eject plate 21, eject springs 23 bridge.

Although the disk holder 22 is provided with the projection pieces 223 and the bores 133 are formed in the main frame 13 in the above-mentioned embodiment, restriction is not made to this and the main frame 13 may be provided with projection pieces and bores may be formed in the disk holder 22.

In addition, the disk holder 22 has a rectangular opening section 224 at a center portion in a back side in the insertion direction A. The rectangular opening section 224 is laid in a corresponding position of the upper carriage 15U of the carriage assembly 15 and extends in the predetermined radial direction C. So as to enclose the opening section 224, a U-shaped swelled portion 225 is formed where the principal surface 220 of the disk holder swells at periphery upwards. On the other hand, the carriage assembly 15 comprises a pair of side arms 153 which extends in a lateral direction perpendicular to a longitudinal direction of the carriage assembly 15. The side arms 153 are located on or over the swelled portion 225. As will later be described, in a state where the flexible disk is ejected from the disk holder 22, the side arms 153 engages with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) rotatably move.

In the vicinity of the carriage assembly 15 on the main frame 13, the eject lever depicted at 24 is formed to rotatably move. More specifically, on the main frame 13, a rod pin 134 stands up which extends from the main surface thereof upwards. The eject lever 24 comprises a cylindrical part 240 in which the rod pin 134 is inserted, an arm part (the lever part) 241 extending from the cylindrical part 240 in a radial direction, a projection part 242 which is formed in the arm part 241 at a free end thereof and which extends upwards, and an arc-shaped stop part 243 which extends from a side of the free end of the arm part 241 in a circumferential direction. In the eject lever 24, an eject lever spring 25 is attached around the cylindrical part 240 and the eject lever spring 25 urges the eject lever 24 in a counterclockwise direction on a paper of FIG. 3. The projection part 242 of the eject lever 24 is freely fitted in the opening section 226 of the disk holder 22. The projection part 242 is engaged with an upper end of a right-hand side edge of a shutter in the flexible disk, that will later be described, to control opening and shutting of the shutter. In addition, as shown in FIG. 4, a screw 26 is thrust into a tip of the rod pin 134, thereby preventing the eject lever 24 from falling off the rod pin 134.

In addition, the main frame 13 has a front end section on which a front panel 27 is attached. The front panel 27 has an opening 271 for taking the flexible disk in and out and a door 272 for opening and shutting the opening 271. Into the front panel 27, an eject button 28 projects movably backward and forward. The eject button 28 is fitted in a protrusion part 214 which protrudes from a front end of the eject plate 21 forwards.

Figure 5:
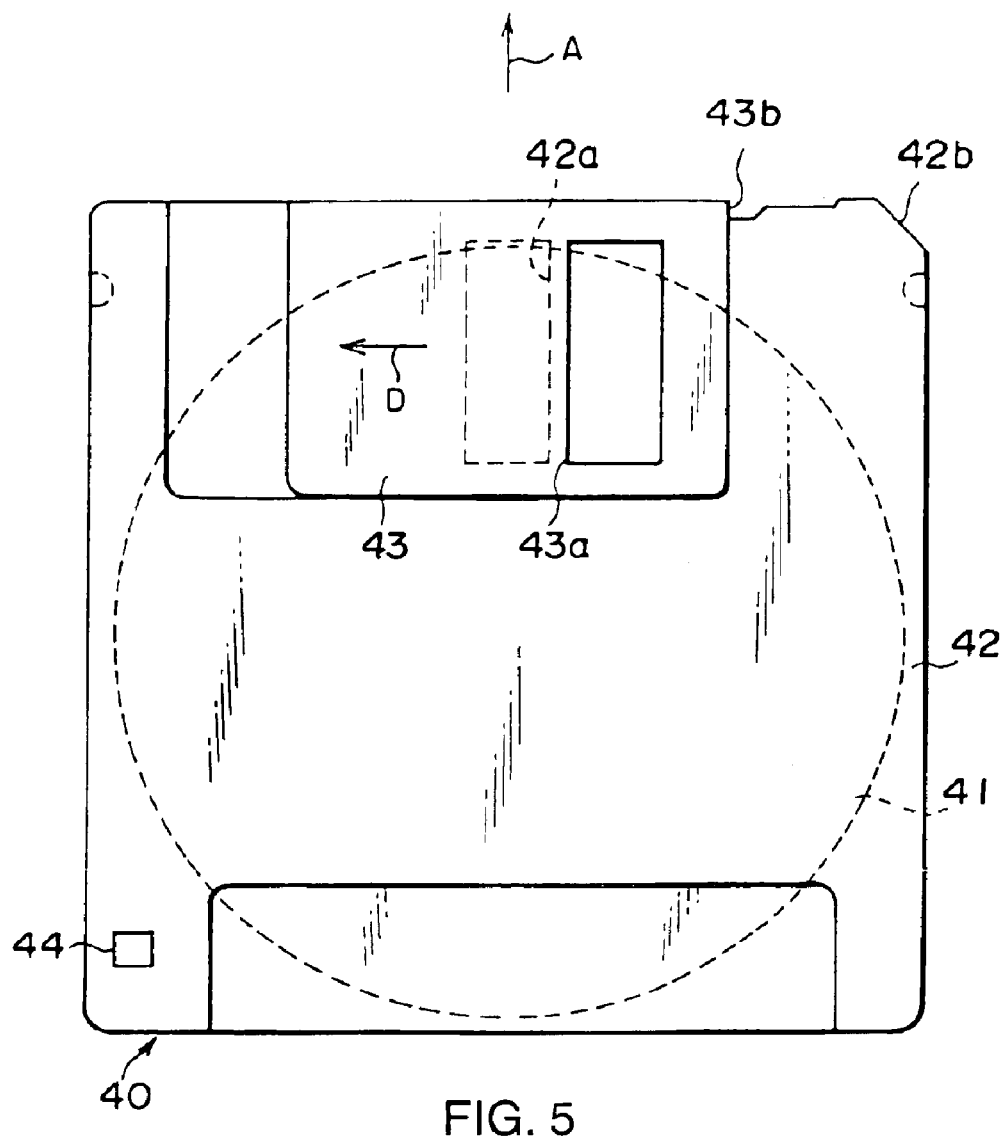
FIG. 5 is a plan view showing a flexible disk driven by the flexible disk drive.

Referring to FIG. 5, the description will proceed to the flexible disk (FD) driven by the flexible disk drive (FDD) illustrated in FIGS. 3 and 4. The illustrated flexible disk depicted at 40 comprises a disk-shaped magnetic recording medium 41, a shell 42 for covering or receiving the magnetic recording medium 41, and the shutter depicted at 43 slidably in a direction indicated by an arrow D in FIG. 5. The shutter 43 has a shutter window 43a. The shutter 43 is urged by a spring member (not shown) in a direction reverse to the direction D. The shell 42 has a head window 42a to enable an access of the magnetic recording medium 41 by the magnetic heads 14 (FIGS. 3 and 4) of the flexible disk drive.

In a state where the flexible disk 40 is not loaded in the flexible disk drive, the head window 43a is covered by the shutter 43 as shown in FIG. 5. When the flexible disk 40 is loaded in the flexible disk drive, the projection part 242 of the eject lever 42 (FIG. 3) engages with the upper end 43b of the right-hand side edge of the shutter 43 to slide the shutter 43 in the direction depicted at the arrow D.

The shell 42 has a chamfered portion 42b at a corner portion in upper and right-hand side. The chamfered portion 42b is for preventing reverse insertion (wrong insertion in a vertical direction or the insertion direction A). In addition, a write protection hole 44 is bored in the shell 42 at a corner portion in rear and left-hand side in the insertion direction A of FIG. 5.

As described above, in the flexible disk 40 driven by the flexible disk drive, the magnetic recording medium 41 accessed by the magnetic heads 14 (FIGS. 3 and 4) has a plurality of tracks on a surface thereof that serve as paths for recording data and that are formed in a concentric circle along a radial direction. The flexible disk 40 has eighty tracks on side which include the most outer circumference track (the most end track TR00 and the most inner circumference track TR79.

Figure 6:
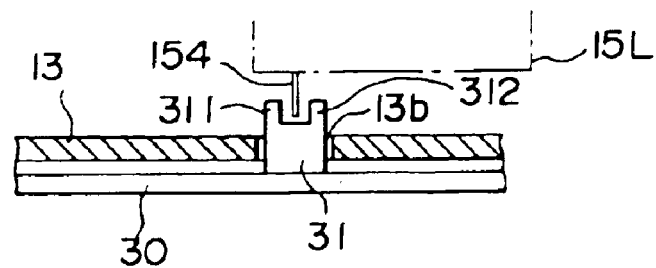
FIG. 6 is a sectional view for use in describing a set-up structure of a track position detecting mechanism (00 sensor) used in the flexible disk drive.

Referring to FIG. 6 in addition to FIG. 3, the description will proceed to a track position detecting mechanism (a 00 sensor) for detecting a position of the most end track TR00 of the magnetic recording medium 41.

In the carriage assembly 15, the lower carriage 15L is provided with an interception plate 154 which projects from a base section thereof downwards. On the other hand, the main printed substrate depicted at 30 is disposed on the back surface of the main frame 13 opposed to the carriage assembly 15. On the main printed substrate 30, a photointerrupter 31, which is used as the track position detecting mechanism (the 00 sensor), is mounted. For this purpose, the main frame 13 has a bore 13b in which the photointerrupter 31 is inserted.

As is well known in the art, the photointerrupter 31 comprises a first protrusion section 311 into which a light-emitting element (which will later be described) is built and a second protrusion section 312 into which a light-receiving element (which will later be described) is built. The first protrusion section 311 and the second protrusion section 312 are opposed to each other at two opposite wall surfaces which have two opening sections (not shown), as shown in FIG. 6. Through the two opening sections, an optical path is formed to go from the light-emitting element to the light-receiving element. In addition, the above-mentioned interception plate 154 passes through a path between the first protrusion section 311 and the second protrusion section 312.

In the 00 sensor with such a structure, it is possible to detect that the magnetic heads 14 (FIGS. 3 and 4) are laid in the position of the most end track TR00 in the magnetic recording medium 41 of the flexible disk 40 because the interception plate 154 intercepts the optical path in the photointerrupter 31.

Figure 7:
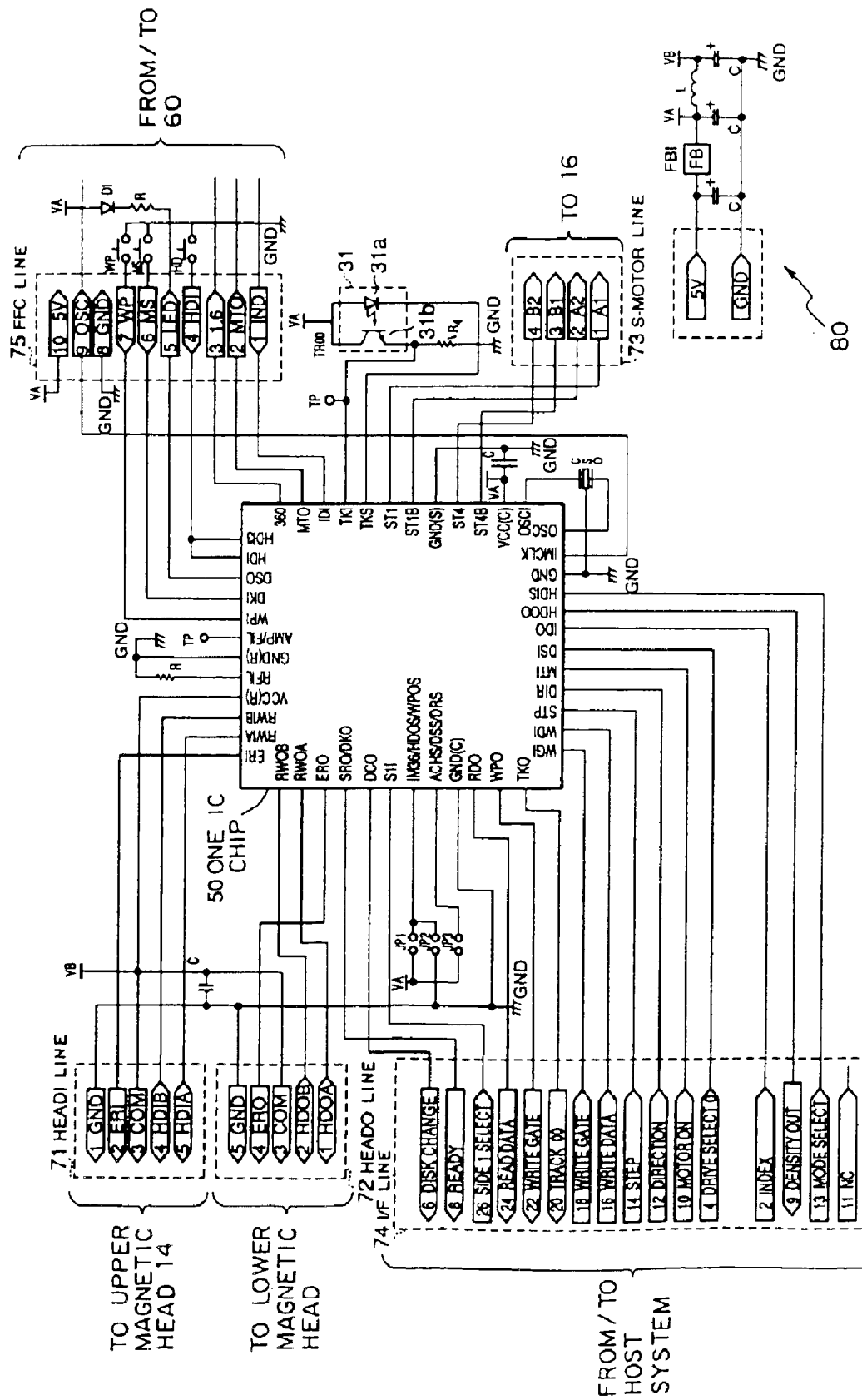
FIG. 7 is a plan view showing an external appearance of one IC chip of an FDD control apparatus to which this invention is applicable.
Figure 8:
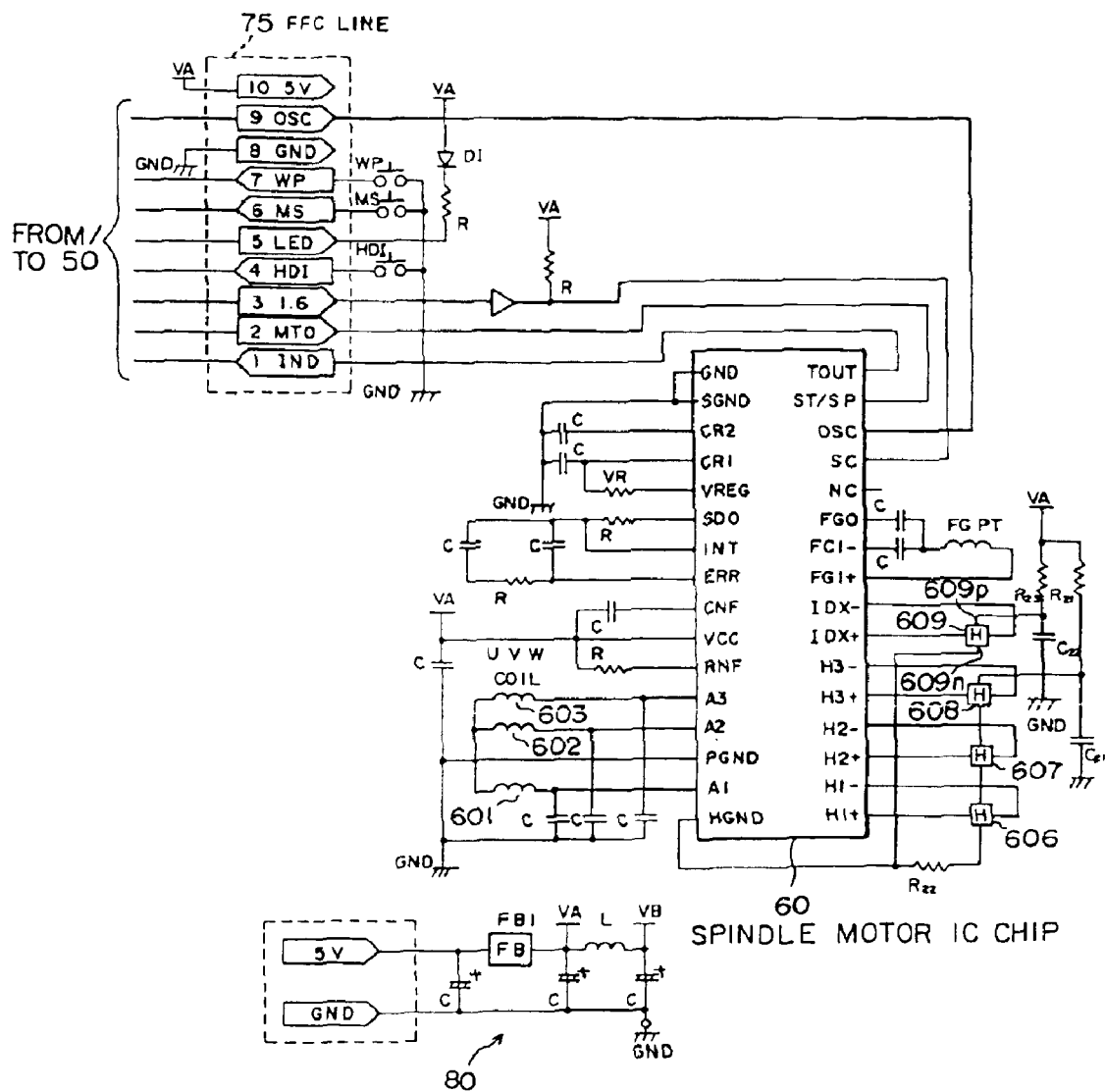
FIG. 8 is a plan view showing an external appearance of a spindle motor IC chip of the FDD control apparatus that is used together with the one IC chip illustrated in FIG. 7.

Referring to FIGS. 7 and 8, the description will proceed to an FDD control apparatus for controlling the flexible disk drive illustrated in FIGS. 3 and 4.

The illustrated FDD control apparatus comprises one integrated circuit (IC) chip 50 (FIG. 7), a spindle motor IC chip 60 (FIG. 8), and a power supply circuit 80. The one IC chip 50, the spindle motor IC chip 60, and the power supply circuit 80 are mounted on the main printed substrate 30 (FIG. 6). The spindle motor IC chip 60 is an IC chip for controlling drive of the spindle motor and is implemented by a bipolar IC chip where a number of bipolar transistors are integrated therein. On the other hand, the one IC chip 50 is implemented by a metal oxide semiconductor (MOS) IC chip where a number of MOS field effect transistors (FETs) are integrated therein. The power supply circuit 80 is a circuit for supplying a voltage of 5 V when a power switch (not shown) is turned on. The power supply circuit 80 has a first power supply terminal VA and a second power supply terminal VB.

Figure 9:
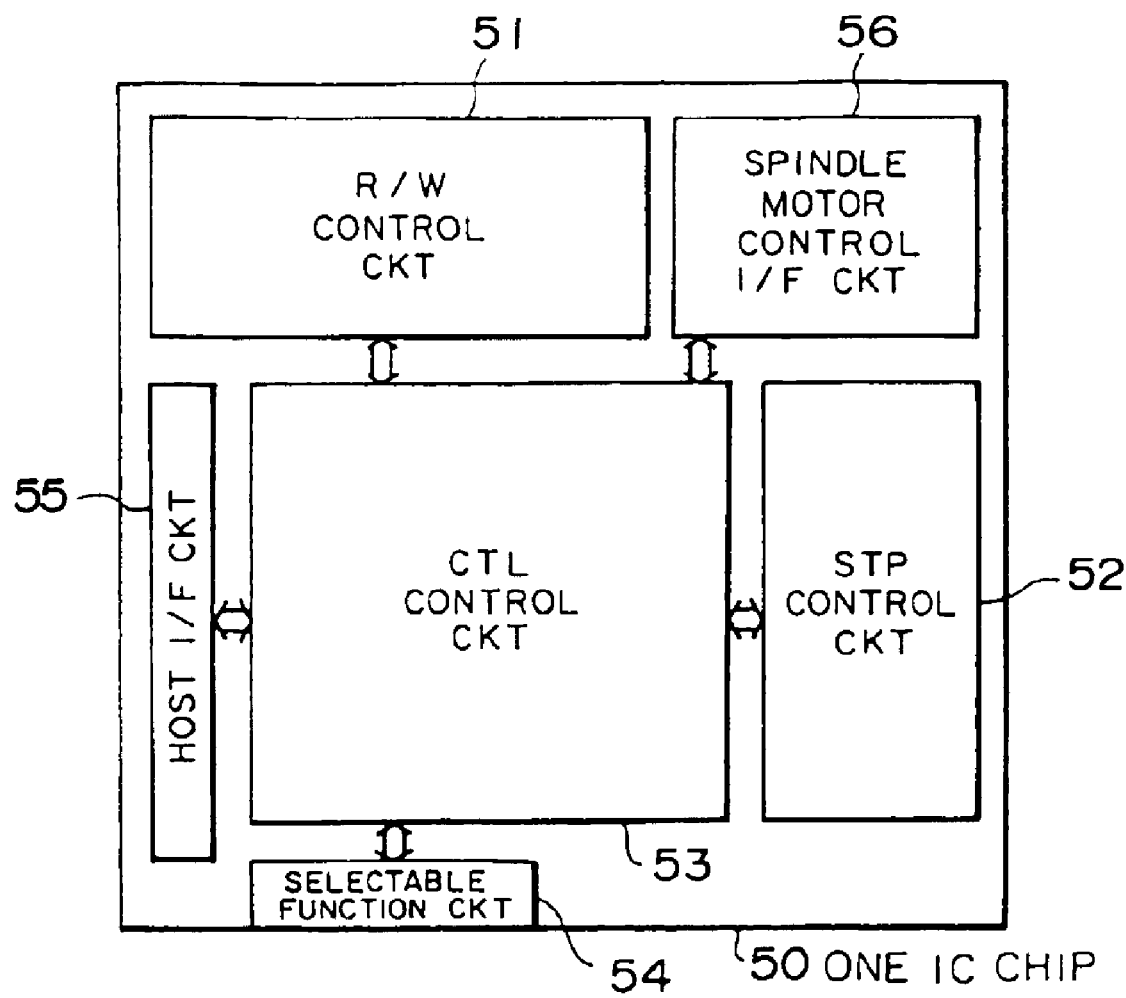
FIG. 9 is a block diagram showing a schematic structure of the one IC chip illustrated in FIG. 7.

Referring to FIG. 9 in addition to FIG. 7, the one IC chip 50 incorporates first through third control circuits 51, 52, and 53 therein. The first control circuit 51 is a R/W control circuit for controlling reading/writing of data. The second control circuit 52 is a STP control circuit for controlling drive of the stepping motor 16 (FIG. 3). The third control circuit 53 is a CTL control circuit for controlling whole operation of the flexible disk drive and may be called a logic circuit.

The one IC chip 50 further comprises the above-mentioned selectable function circuit depicted at 54, a host interface (I/F) circuit 55, and a spindle motor control I/F circuit 56. The CTL control circuit 53 is connected to R/W control circuit 51, the STP control circuit 52, the selectable function circuit 54, the host I/F circuit 55, and the spindle motor control I/F circuit 56.

The R/W control circuit 51 is connected to the upper magnetic head 14 (FIG. 3) and the lower magnetic head through a HEAD1 line 71 and a HEAD0 line 72, respectively. The STP control circuit 52 is connected to the stepping motor 16 (FIG. 3) through an S-MOTOR line 73. The host I/F circuit 55 is connected to a host system (not shown) through an I/F line 74. The spindle motor control I/F circuit 56 is connected to the spindle motor IC chip 60 (FIG. 8) through an FFC line 75.

Now, the description will proceed to input/output terminals of the one IC chip 50. Throughout this specification, no distinction is made between names for input/output terminals and names for signals and description will be made with the same reference symbols.

The one IC chip 50 has R/W output terminals (ER1, RW1A, RW1B, ER0, RW0A, RW0B, VCC(R)) which are connected to the HEAD1 line 71 and the HEAD0 line 72. In addition, the one IC chip 50 has STP output terminals (ST1, ST1B, ST4, ST4B) which are connected to the S-MOTOR line 73. Furthermore, the one IC chip 50 has host input/output terminals (DC0, S1I, RD0, WP0, TK0, WGI, WDI, STP, DIR, MTI, DSI, ID0, HDO0, HDIS) which are connected to the I/F line 74. The one IC chip 50 has spindle motor controlling input/output terminals (IDI, MTO, 360, HDI3, HDI, DSO, DKI, WPI, 1MCLK) which are connected to the FFC line 75. Other than these input/output terminals, the one IC chip 50 has two selectable function input terminals (1M36/HDOS/WPOS, ACHS/DSS/DRS), three input terminals for the 00 sensor (AMP/FIL, TKI, TKS), and so on.

In the spindle motor controlling input/output terminals connected to the FFC line 75, the DKI terminal (signal) is a signal indicating whether or not the flexible disk 40 is inserted in the flexible disk drive. For this purpose, as shown in FIG. 7, the FDD control apparatus comprises a switch MS for detecting whether the flexible disk is inserted or is not inserted in the flexible disk drive. In the host input/output terminals connected to the I/F line 74, the DIR terminal (signal) is a signal for defining a seeking (moving) direction of the magnetic heads supplied from the host system. When the DIR signal has a logic low level, the seeking direction indicates an inside direction. When the DIR signal has a logic high level, the seeking direction indicates an outside direction. In the STP output terminals connected to the S-MOTOR line 73, the ST1 terminal (signal) and the ST4 terminal (signal) are signals indicative of phase excitation. When both of the ST1 signal and the ST4 signal have a logic high level, they indicate that the magnetic heads are laid in the track position having an even number. When both of them have a logic low level, they indicate that the magnetic head are laid in the track position having an odd number.

The photointerrupter 31 serving as the 00 sensor which comprises a light emitting diode (LED) 31a acting as the light-emitting element and a photo transistor 31b acting as the light-receiving element. The light emitting diode 31a has an anode connected to the first power supply terminal VA (Vcc) and a cathode connected to the TKS terminal of the one IC chip 50. The photo transistor 31b has a collector connected to the first power supply terminal VA (Vcc). In addition, the photo transistor 31b has an emitter which is grounded through a resistor $R_4$ and which is connected to the TKI terminal and the AMP/FIL terminal of the one IC chip 50.

The TKI terminal (signal) is a signal having a logic low level when the optical path of the photointerrupter 31 is interrupted by the interception plate 154.

The CTL control circuit 53 is supplied with the above-mentioned DKI signal through the spindle motor control I/F circuit 56. In addition, the CTL control circuit 53 is supplied with the above-mentioned TKI signal. Furthermore, the CTL control circuit 53 is supplied with the above-mentioned ST1 signal and the above-mentioned ST4 signal from the STP control circuit 52. The CTL control circuit 53 is supplied with the above-mentioned DIR signal through the host I/F circuit 55.

Usually, when the TKI signal has the logic low level, the DIR signal has the logic low level, and both of the ST1 signal and the ST4 signal have the logic high level, the CTL control circuit 53 determines that the magnetic heads 14 are laid in the position of the most end track TR00 in the magnetic recording medium of the flexible disk and supplies the track 00 signal (TKO signal) to the host system through the host I/F circuit 55.

However, according to this invention, in the manner which will later be described, the CLT control circuit 53 supplies the track 00 signal to the host system just as if it seems that the flexible disk drive normally operates although the flexible disk is not inserted in the flexible disk drive.

Turning to FIG. 8, the spindle motor controlled by the spindle motor IC chip 60 is a brushless three-phase D.C. motor which has three coils (stator windings) 601, 602, and 603 of U-phase, V-phase, and W-phase although detailed structure thereof is not illustrated. In addition, the spindle motor comprises a permanent magnet type rotor (not shown) and a rotor position detector (which will later be described) for producing rotor position detected signals. On the other hand, the spindle motor IC chip 60 incorporates a driving transistor (a transistor rectifier) therein which consists of a plurality of bipolar transistors. That is, responsive to a rotor position of the motor, the spindle motor makes the bipolar transistors turn on and off to flow an electric current in the stator winding in question, thereby generates torque between magnetic poles of the rotor and the stator winding to rotate the rotor. With rotation of the rotor, the rotor position detected signals produced by the rotor position detector are changed to change the stator windings flowing the electric current, thereby continuing the rotation of the rotor.

In addition, the spindle motor comprises a frequency generation pattern FGPT for detecting the rotation speed of the rotor. The spindle motor IC chip 60 changes the stator windings to flow the electric current on the basis of the rotation speed of the rotor detected by the frequency generation pattern FGPT in accordance with the rotor position detected signals produced by the rotor position detector.

As shown in FIG. 8, three Hall devices 606, 607, and 608 are used as the above-mentioned rotor position detector. See, for example, U.S. Pat. No. 4,882,511 issued to Johann von der Heide as regards detailed relationship for arrangement of the Hall devices 606 to 608. In addition, another Hall device 609 is used for detection of an index.

Figure 10:
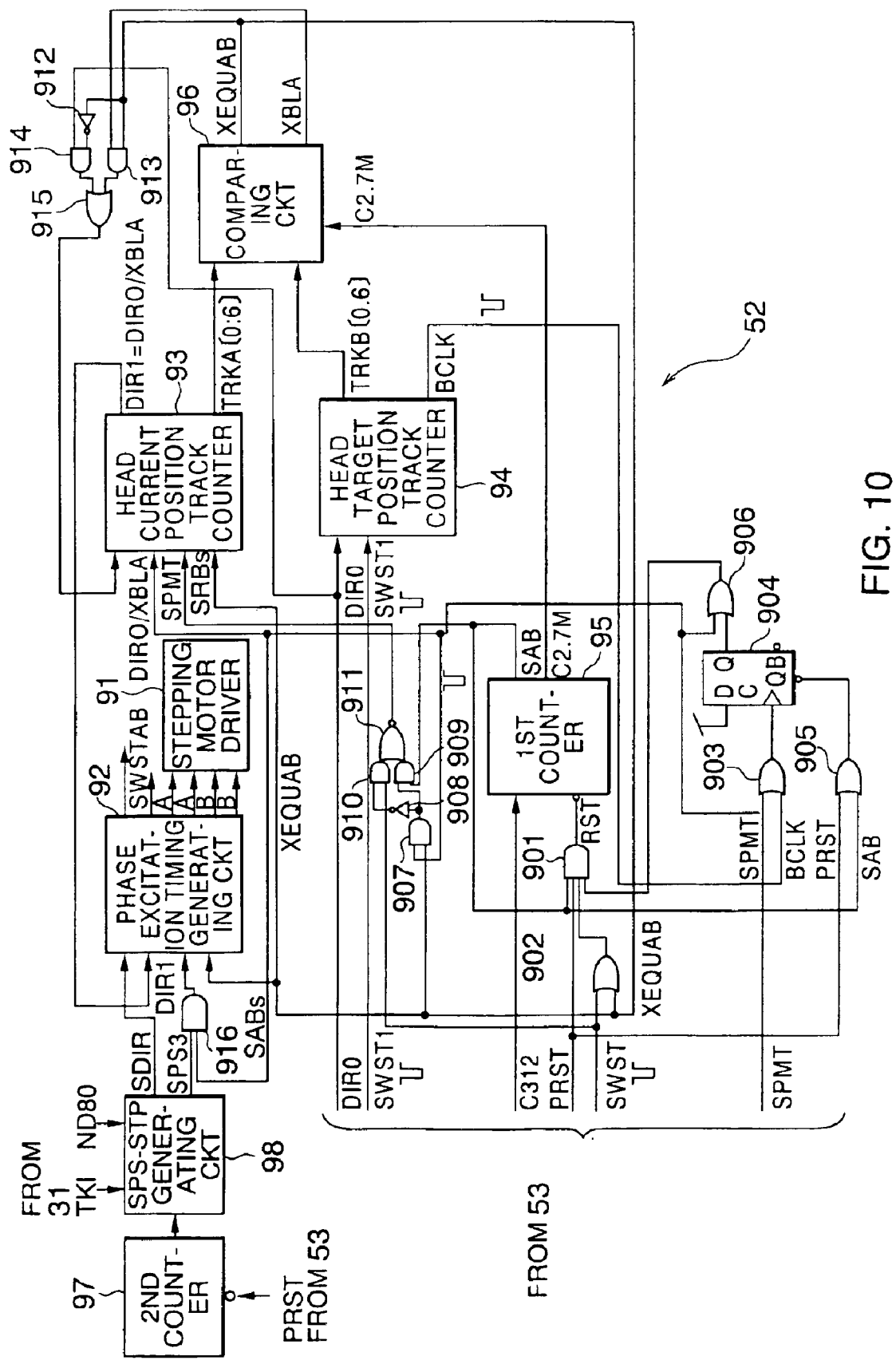
FIG. 10 is a block diagram of a stepping motor control circuit for use in the FDD control apparatus.

Referring to FIG. 10, the description will proceed to the STP control circuit 52 in the FDD control apparatus to which this invention is applicable.

As illustrated in FIG. 6, the STP control circuit 52 comprises a stepping motor driver 91 for driving the stepping motor 16 (FIG. 3), a phase excitation timing generating circuit 92 for generating a phase excitation timing signal for the stepping motor driver 91, a head current position track counter 93 for indicating a current position of the magnetic heads 14 (FIG. 3), a head target position track counter 94 for indicating a target position of the magnetic heads 14, a first counter 95, a comparing circuit 96, a second counter 97, a special seek step signal generating circuit (SPS-STP generating circuit) 98, and various logic circuits and flip-flops which will later be described. In this specification, the head current position track counter 93 is called a "track counter A" while the head target position track counter 94 is called a "track counter B."

The illustrated STP control circuit 52 is supplied with, as input signals, an external step signal SWT1, an external seek direction signal DIR0, a signal C312, an external reset signal PRST, an external step signal SWST, a signal SPMT, a track 00 signal TKI, and a signal ND80.

The external seek direction signal DIR0 is a signal holding the seek signal by triggering the step signal supplied at a then the drive select signal takes the logic high level. The external seek direction signal SWT1 is a signal supplied at a time when the drive select signal takes the logic low level. The signal C312 is an external clock signal having a clock period of 3.1 milliseconds. The external reset signal PRST is a signal validated after a lapse of 100 milliseconds from power on. The external step signal SWST is a step signal supplied at a time when the drive select signal takes the logic low level and when the signal SPMT, which will later be described, takes the logic high level. The signal SPMT is a signal validated after a lapse of 200 milliseconds when the spindle motor is turned on (or the MTO signal is activated).

The external seek direction signal DIR0 and the external step signal SWST1 are supplied to the head target position track counter 94. The external clock signal C312 is supplied to the first counter 95. The external reset signal PRST is supplied to the first counter 95 through a first AND gate 901 as an internal reset signal RST. In the manner which will later become clear, the first AND gate 901 produces a first ANDed signal as the internal reset signal RST. The external step signal SWST is supplied to the first counter 95 through a first OR gate 902 and the first AND gate 901. In the manner which will later become clear, the first OR gate 902 produces a first ORed signal. The signal SPMT is supplied to the head current position track counter 93.

In the manner which will later be described, the head target position track counter 94 produces an internal clock signal BCLK. The signal SPMT and the internal clock signal BCLK are supplied to a second OR gate 903. The second OR gate 903 ORs the signal SPMT and the internal clock signal BCLK to produce a second ORed signal which is supplied to a clock input terminal of a D-type flip-flip 904. In the manner which will later be described, the first counter 95 produces an internal step signal SAB. The external reset signal PRST and the internal step signal SAB are supplied to a third OR gate 905. The third OR gate 905 ORs the external reset signal PRST and the internal step signal SAB to produce a third ORed signal which is supplied to a reset terminal of the D-type flip-flip 904. The D-type flip-flop 904 produces a held output signal which is supplied to a fourth OR gate 906. The fourth OR gate 906 is supplied with the signal SPMT. The fourth OR gate 906 ORs the held output signal from the D-type flip-flop 904 and the signal SMPT to produce a fourth ORed signal which is supplied to the first AND gate 901. The first AND gate 901 is also supplied with the internal step signal SAB from the first counter 95. That is, the first AND gate 901 ANDs the internal step signal SAB, the external reset signal PRST, the first ORed signal, the fourth ORed signal to produce the first ANDed signal which is supplied to the first counter 95 as the internal reset signal RST.

The first counter 95 produces the internal step signal SAB every four milliseconds. The internal step signal SAB is for equalizing a current position counted value A of the head current position track counter 93 with a target position counted value B of the head target position track counter 94. At any rate, the first counter 95 is activated while the flexible disk 40 (FIG. 5) is inserted or loaded in the flexible disk drive and serves as an internal step signal producing arrangement for producing the internal step signal SAB.

In addition, the first counter 95 is triggered by the external step signal SWST to produce a trigger signal C2.7M for comparing the current position counted value A of the head current position track counter 93 with the target position counted value B of the head target position track counter 94. The trigger signal C2.7M is supplied to the comparing circuit 96.

In the manner which will later be described, the comparing circuit 96 produces a coincidence signal XEQUAB which is supplied to the first OR gate 903. The coincidence signal XEQUAB takes logic high level when the current position counted value A of the head current position track counter 93 is different from the target position counted value B of the head target position track counter 94. The coincidence signal EXQUAB takes the logic low level when the current position counted value A of the head current position track counter 93 is equal to the target position counted value B of the head target position track counter 94. When the coincidence signal XEQUAB takes the logic high level or when the current position counted value A is different from the target position counted value B, the first OR gate 903 masks the external step signal SWST. The coincidence signal XEQUAB is also supplied to the phase excitation timing generating circuit 92 and the head current position track counter 93.

Furthermore, the coincidence signal XEQUAB is supplied to a second AND gate 907 which is supplied with the signal SPMT. The second AND gate 907 ANDs the coincidence signal XEQUAB and the signal SPMT to produce a second ANDed signal which is supplied to a first inverter 908 and a third AND gate 909. The third AND gate 909 is supplied with the internal step signal SAB from the first counter 95. The third AND gate 909 ANDs the third ANDed signal and the internal step signal SAB to produce a third ANDed signal. The first inverter 908 inverts the second ANDed signal to produce a first inverted signal which is supplied to a fourth AND gate 910. The fourth AND gate 910 is supplied with the external step signal SWST. The fourth AND gate 910 ANDs the first inverted signal and the external step signal SWST to produce a fourth ANDed signal. The third ANDed signal and the fourth ANDed signal are supplied to a NOR gate 911. The NOR gate 911 NORs the fourth ANDed signal and the third ANDed signal to produce a NORed signal as a selected step signal SABs.

That is, a combination of the second AND gate 907, the first inverter 908, the third AND gate 909, the fourth AND gate 910, and the NOR gate 911 is activated when the flexible disk 40 (FIG. 5) is inserted or loaded in the flexible disk drive and serves as a step signal selecting arrangement for selecting the external step signal SWST as the selected step signal SABs when the coincidence signal XEQUAB takes the logic low level and for selecting the internal step signal SAB as the selected step signal SABs when the coincidence signal XEQUAB takes the logic high level. Produced by the step signal selecting arrangement, the selected step signal SABs is directly supplied to the head current position track counter 93 and is supplied to the phase excitation timing generating circuit 92 through an AND gate 916.

Regardless of whether the flexible disk 40 is inserted or loaded in the flexible disk drive or not, the head target position counter 94 produces, in response to the external seek direction signal DIR0 and the external step signal SWST1, the internal clock signal BCLK and a target track position signal TRKB[0:6] indicative of the target position counted value B corresponding to a target track position of the magnetic heads 14 (FIG. 3). Although the internal clock signal BCLK is a signal through the external step signal SWST passes, the internal clock signal BCLK is masked when the target position counted value B of the head target position track counter 94 is not more than "0" and is not less than "81."

The target track position signal TRKB[0:6] is supplied to the comparing circuit 96. In the manner which will later be described, the head current position track counter 93 produces a current track position signal TRKA[0:6] indicative of the current position counted value A corresponding to an actual current track position of the magnetic heads 14. The comparing circuit 96 is supplied with the current track position signal TRKA[0:6]. Responsive to the trigger signal C2.7M, the comparing circuit 96 compares the current position counted value A indicated by the current track position signal TRKA[0:6] with the target position counted value B indicated by the target track position signal TRKA[0:6] to produce the above-mentioned coincidence signal XEQUAB and an internal seek direction signal XBLA. In the manner which is described above, the coincidence signal XEQUAB takes the logic high level when the current position counted value A is different from the target position counted value B and the coincidence signal XEQUAB takes the logic low level when the current position counted value A is equal to the target position counted value B.

The internal seek direction signal XBLA takes the logic high level when the current position counted value A is larger than the target position counted value B. The internal seek direction signal XBLA takes the logic low level when the current position counted value A is smaller than the target position counted value B. In other words, the internal seek direction signal XBLA is a signal indicative of a seek direction for equalizing the current position counted value A with the target position counted value B.

The coincidence signal XEQUAB is supplied to a second inverter 913 and a fifth AND gate 913. The fifth AND gate 913 is supplied with the internal seek direction signal XBLA. The fifth AND gate 913 ANDs the coincidence signal XEQUAB and the internal seek direction signal XBLA to produce a fifth ANDed signal. The second inverter 913 inverts the coincidence signal XEQUAB to produce a second inverted signal which is supplied to a sixth AND gate 914. The sixth AND gate 914 is supplied with the external seek direction signal DIR0. The sixth AND gate 914 ANDs the second inverted signal and the external seek direction signal DIR0 to produce a sixth ANDed signal. The sixth ANDed signal and the fifth ANDed signal are supplied to a fifth OR gate 915. The fifth OR gate 915 ORs the fifth ANDed signal and the sixth ANDed signal to produce a fifth ORed signal as a selected seek direction signal DIR0/XBLA which is supplied to the head current position track counter 93.

At any rate, a combination of the second inverter 912, the fifth AND gate 913, the sixth AND gate 914, and the fifth OR gate 915 serves as a seek direction selecting arrangement for selecting the internal seek direction signal XBLA as the selected seek direction signal DIR0/XBLA when the coincidence signal XEQUAB takes the logic high level and for selecting the external seek direction signal DIR0 as the selected seek direction signal DIR0/XBLA when the coincidence signal XEQUAB takes the logic low level.

When the coincidence signal XEQUAB takes the logic high level or when the current position counted value A is different from the target position counted value B, the head current track counter 93 counts, in synchronism with the internal step signal SAB, the current position counted value A in a direction indicated by the internal seek direction signal XBLA. Conversely, when the coincidence signal XEQUAB takes the logic low level or when the current position counted value A is equal to the target position counted value B, the head current position track counter 93 counts, in synchronism with the external step signal SWST, the current position counted value A in a direction indicated by the external seek direction signal DIR0. The head current position track counter 93 produces the above-mentioned current track position signal TRKA[0:6] and a selected seek direction signal DIR1. The selected seek direction signal DIR1 is the selected seek direction signal DIR0/XBLA supplied to the head current position track counter 93 as it is. The selected seek direction signal DIR1 is supplied to the phase excitation timing generating circuit 92.

The phase excitation timing generating circuit 93 operates in synchronism with the internal step signal SAB when the coincidence signal XEQUAB takes the logic high level or when the current position counted value A is different from the target position counted value B. In this event, the phase excitation timing generating circuit 92 generates the signal SWSTAB for generating substep pulses. On the other hand, when the coincidence signal XEQUAB takes the logic low level or when the current position counted value A is equal to the target position counted value B, the phase excitation timing generating circuit 92 operates in synchronism with the external step signal SWST. That is, a combination of the phase excitation timing generating circuit 92 and the stepping motor driver 91 serves as a driving arrangement for driving the stepping motor 16 (FIG. 3) on the basis of the selected seek direction signal DIR1 and the selected step signal SABs.

In addition, a combination of the first counter 95, the head current position track counter 93, the comparing circuit 96, the phase excitation timing generating circuit 92, the stepping motor driver 91, the seek direction selecting arrangement, and the step signal selecting arrangement serves as an automatic seeking arrangement for automatically seeking the magnetic heads 14 (FIG. 3) up to the target track position indicated by the target track position signal TRKA[0:6] by driving the stepping motor 16 (FIG. 3) when the flexible disk 40 (FIG. 5) is inserted or loaded in the flexible disk drive.

The second counter 97 is supplied with the external reset signal PRST Responsive to the external reset signal PRST, the second counter 97 starts a counting operation to supply its counted value to the SPS-STP generating circuit 98. The SPS-STP generating circuit 98 is a circuit for carrying out a special seek operation and generates a special seek step signal SPS3 on the basis of the counted value of the second counter 97. The special seek step signal SPS3 is supplied to the phase excitation timing generating circuit 92 through the AND gate 916. That is, the AND gate 916 ANDs the special seek step signal SPS3 and the selected step signal SABs to supply its output signal to the phase excitation timing generating circuit 92. In addition, the SPS-STP generating circuit 98 is supplied with the track 00 signal TKI from the photointerrupter 31 and is supplied with a signal ND80. The signal ND80 is a signal activated after a lapse of a predetermined time interval from a time instant when the SPS-STP generating circuit 98 generates the special seek step signal SPS3. The SPS-STP generating circuit 98 determines a special seek direction by monitoring the track 00 signal TKI by the signal ND80 to produce a special seek direction signal SDIR.

More specifically, the SPS-STP generating circuit 98 contains a flip-flop which is not shown. The flip-flop has a data input terminal supplied with the track 00 signal TKI and a clock input terminal supplied with the signal ND80. By checking a logic in the track 00 signal TKI when the signal ND80 is activated using the flip-flop, the SPS-STP generating circuit 98 determines a direction to be sought.

In the manner which is described above, the flexible disk 40 has eighty tracks on one side. The magnetic heads 14 can physically move up to eighty-two tracks. On the other hand, when the power supply is turned on, it is not cleat that the magnetic heads 14 are laid in which track position of the flexible disk 40. The special seek is to return the magnetic heads 14 back to the most circumference track (the most end track) on the flexible disk 40 as initialization, in the manner which is described above. There are first and second cases operatively.

The first case is a case where the magnetic heads 16 are laid in the most end track TR00. In this event, the magnetic heads 14 is once moved from a position of the most end track toward an inside direction of the flexible disk 40. A movement toward the inside direction is carried out until the track 00 signal TKI produced by the photointerrupter 31 for sensing the position of the most end track TR00 shifts from the logic low level to the logic high level. Thereafter, the magnetic heads 14 are moved toward an outside direction of the flexible disk 40 again and the magnetic heads 14 are turned back to the most end track TK00 on the flexible disk 40.

The second case is a case where the magnetic heads 16 are laid in a position except for the most end track TR00. In this event, the magnetic heads 14 are sought (moved) toward the outside direction of the flexible disk 40 in order to return the magnetic heads 14 back to the most end track TR00.

The seek moves by one track in response to one pulse of the special seek step signal SPS3. Accordingly, whenever the SPS-STP generating circuit 98 generates the special seek step signal SPS3, the SPS-STP generating circuit 98 determines the special seek direction by taking a state (logic value) of the track 00 signal TKI in the flip-flop FF by activating the signal ND80 after a lapse of the predetermined time interval from a time instant of the generation of the special seek step signal SPS3. In short, inasmuch as the step signal is not supplied from the outside in the "special seek", a signal similar to the external step signal is generated within the SPS-STP generating circuit 98. This generated signal is the above-mentioned special seek step signal.

Figure 11:
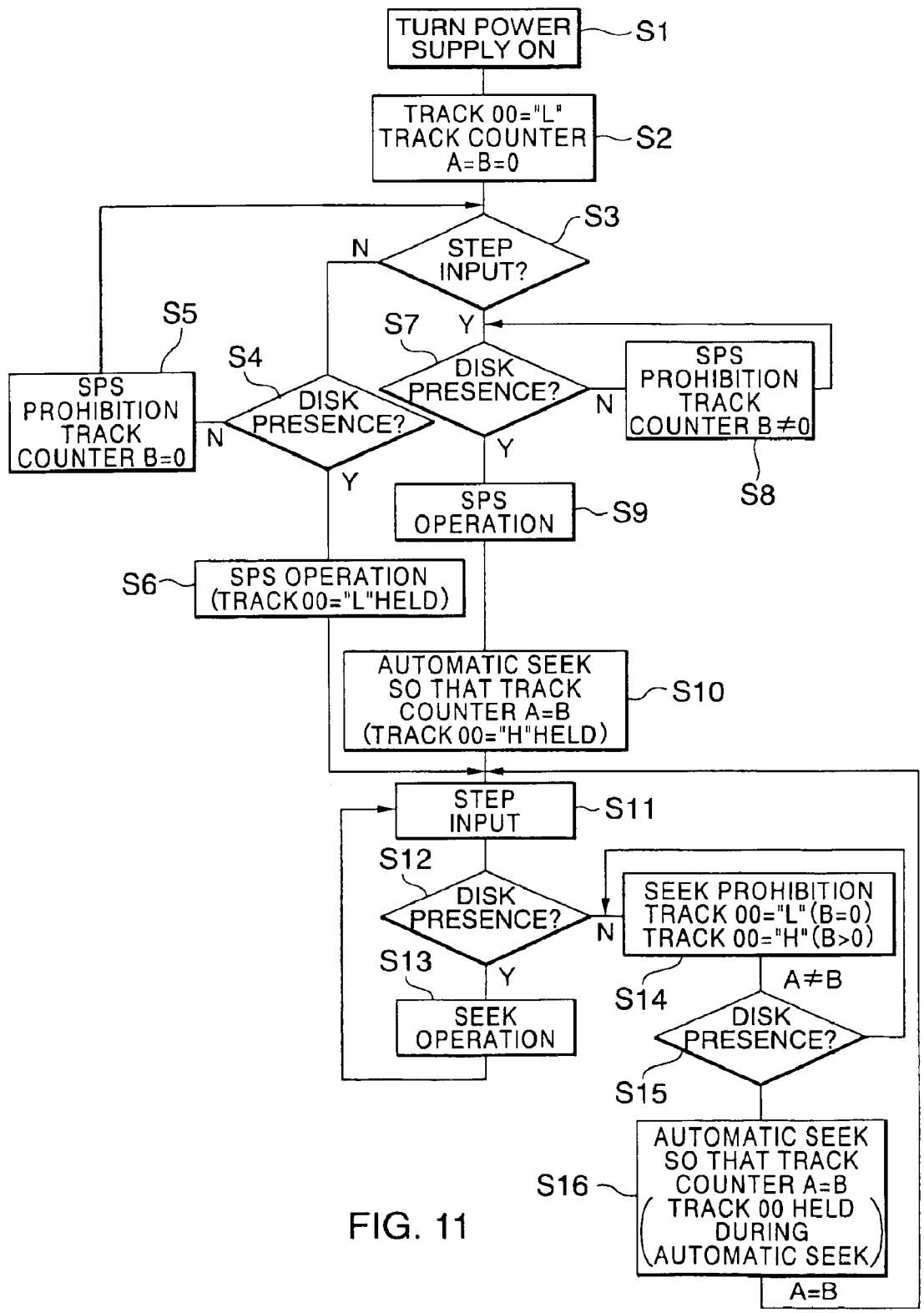
FIG. 11 is a flow chart for use in describing an FDD control method according to a preferred embodiment of this invention.

Referring now to FIG. 11 in addition to FIGS. 3 through 10, the description will proceed to the FDD control method according to this invention.

When the power supply is turned on (step S1), the CTL control circuit 53 supplies the track 00 signal (TKO signal) having the logic low level to the host system through the host I/F circuit 55 and the I/F line 74. In this event, inasmuch as the CTL control circuit 53 does not supply the external step signal SWT1 to the STP control circuit 52, both of the current position counted value A of the head current position track counter 93 (the track counter A) and the target position counted value B of the head target position track counter 94 (the track counter B) are equal to zero (step S2). That is, the track 00 signal (TKO signal) having the logic low level is sent to the host system, regardless of whether the flexible disk 40 is inserted or is not inserted in the flexible disk drive in question.

Subsequently, the CTL control circuit 53 determines whether or not the step signal (STP signal) is supplied from the host system (step S3). When the step signal is not supplied from the host system, the step S3 is followed by a step S4 at which the CTL control circuit 53 determines whether or not the flexible disk 40 is inserted in the flexible disk drive in question. This determination is carried out by checking a logic value of the DKI signal supplied through the FFC line 75 and the spindle motor control I/F circuit 56. That is, if the DKI signal has the logic low level, the flexible disk 40 is inserted in the flexible disk drive. If the DKI signal has the logic high level, the flexible disk 40 is not inserted in the flexible disk drive. When the flexible disk 40 is absent or when the DKI signal has the logic high level, the step S4 is succeeded by a step S5 at which the CTL control circuit 53 prohibits the special seek operation. In this event, inasmuch as the step signal (STP signal) is not supplied to the one IC chip 50, the head target position track counter 94 (the track counter B) keeps the target position counted value B of zero. Accordingly, the track 00 signal (TKO signal) keeps the logic low level.

It is noted that the conventional FDD control method always carries out the special seek operation regardless of existence of the flexible disk 40 (see the step S'2 in FIG. 1).

When the flexible disk 40 is present or when the DKI signal has the logic low level, the step S4 proceeds to a step S6 at which the CTL control circuit 53 carries out the special seek operation. The special seek operation herein is carried out using the second counter 97 and the SPS-STP generating circuit 98 in the STP control circuit 52 in the manner which is described above. Inasmuch as the step signal (STP signal) is not supplied, the track 00 signal (TKO signal) keeps the logic low level.

It will be assumed that the step signal (STP signal) is supplied at the step S3. In this event, the step S3 is followed by a step S7 at which the CTL control circuit 53 determines whether or not the flexible disk 40 is inserted in the flexible disk drive in question with reference to the logic value of the DKI signal. When the flexible disk 40 is absent or when the DKI signal has the logic high level, the step S7 is succeeded by a step S8 at which the CTL control circuit 53 prohibits the special seek operation. In this event, inasmuch as the step signal (STP signal) is supplied to the one IC chip 50, the head target position track counter 94 (the track counter B) has the target position counted value B of any value except for zero. Accordingly, the track 00 signal (TKO signal) shifts from the logic low level to the logic high level.

It will be assumed that the flexible disk 40 is present in the step S7 or the DKI signal has the logic low level. In this event, the step S7 proceeds to a step S9 at which the CTL control circuit 53 carries out the special seek operation. The special seek operation is carried out by using the second counter 97 and the SPS-STP generating circuit 98 in the STP control circuit 52 in the manner which is described above. The step S9 is followed by a step S10 at which the CTL control circuit 53 makes the STP control circuit 52 carry out the automatic seek by controlling the STP control circuit 52 so that the current position counted value A of the head current position track counter 93 (the track counter A) makes equal to the target position counted value B of the head target position track counter 94 (the track counter B). Inasmuch as the target position counted value B of the head target position track counter 94 (the track counter B) is a value except for zero, the track 00 signal (TKO signal) keeps the logic high level.

More specifically, inasmuch as the current position counted value A is different from the target position counted value B, the comparing circuit 96 produces the coincidence signal XEQUAB of the logic high level indicative of non-coincidence and the internal seek direction signal XBLA. The first counter 95 produces the internal step signal SAB every four milliseconds. The internal seek direction signal XBLA is selected as the selected seek direction signal in the above-mentioned seek direction selecting arrangement and is supplied to the head current position track counter 93 and to the phase excitation timing generating circuit 92. In addition, the internal step signal SAB is selected as the selected step signal SABs in the above-mentioned step signal selecting arrangement and is supplied to the head current position track counter 93 and to the phase excitation timing generating circuit 92. Therefore, the automatic seek is carried out. This automatic seek is carried out until the current position counted value A makes equal to the target position counted value B.

It will be assumed that the step signal (STP signal) is supplied to the one IC chip 50 after processing in the step S10 or the step S6 (step S11). Under the circumstances, the CTL control circuit 53 determines whether or not the flexible disk 40 is inserted in the flexible disk drive in question with reference to the logic value of the DKI signal (step S12). When the flexible disk is present or when the DKI signal has the logic low level, the step S12 is followed by a step S13 at which the CTL control circuit 53 makes the stepping motor 16 carry out the seek operation by controlling the STP control circuit 52. More specifically, inasmuch as the above-mentioned seek operation is completed and the current position counted value A makes equal to the target position counted value B, the STP control circuit 52 carries out a normal seek operation in response to the external step signal SWST and the external seek direction signal DIR0. Thereafter, the head current position track counter 93 and the head target position track counter 95 continue to count the current position counted value A and the target position counted value B which are always equal to each other.

It will be assumed that the flexible disk 40 is absent in the step S12 or the DKI signal has the logic high level. In this event, the step S12 is succeeded by a step S14 at which the CTL control circuit 53 prohibits the seek operation. If the target position counted value B of the head target position track counter 94 (the track counter B) is equal to zero, the CTL control circuit 53 sends the track 00 signal (TKO signal) having the logic low level to the host system through the host I/F circuit 55 and the I/F line 72. On the other hand, if the target position counted value B of the head target position track counter 94 (the track counter B) is equal to a value except for zero, the CTL control circuit 53 sends the track 00 signal (TKO signal) having the logic high level to the host system through the host I/F circuit 55 and the I/F line 72. Inasmuch as the step signal (STP signal) is supplied to the one IC chip 50 (the step S11), the current position counted value A of the head current position track counter 93 (the track counter A) is different from the target position counted value B of the head target position track counter 94 (the track counter B).

The step S14 proceeds to a step S15 at which the CTL control circuit 53 determines whether or not the flexible disk 40 is inserted in the flexible disk drive in question with reference to the logic value of the DKI signal. If the flexible disk 40 is absent or if the DKI signal has the logic high level, a processing is turned from the step S15 back to the step S14. If the flexible disk 40 is present or if the DKI signal has the logic low level, the step S15 is followed by a step S16 at which the CTL control circuit 53 makes the STP control circuit 52 carry out the above-mentioned automatic seek operation by controlling the STP control circuit 52 so that the current position counted value A of the head current position track counter 93 (the track counter A) makes equal to the target position counted value B of the head target position track counter 94 (the track counter B). During this automatic seek operation, the CTL control circuit 53 holds the above-mentioned track 00 signal (TKO signal).

In the manner which is described above, according to this invention, in a case where the flexible disk 40 is not inserted in the flexible disk drive, the one IC chip 50 produces the track 00 signal (TKO signal) just as if the stepping motor 16 (the magnetic heads 14) normally operate(s) by means of internal counters (the first counter 95, the head current position track counter 93, the head target position track counter 94, and the comparing circuit 96) although the stepping motor 16 (the magnetic heads 14) actually do(es) not operate. When the flexible disk 40 is inserted in the flexible disk drive, it finally make believe to just like normally operate by automatically seeking to a position of the target track where the host system hopes.

While this invention has thus far been described in conjunction with a preferred embodiment thereof, it is to be understood that modifications will be apparent to those skilled in the art without departing from the sprit of the invention. For example, although only the DKI signal is used as an operation condition of the magnetic heads 14 in the above-mentioned embodiment, a motor on signal (MTI signal, MTO signal), a drive selection signal (DSI signal, DSO signal), or the like may be used as the operation condition.

What is claimed is:

1. A method of controlling a flexible disk drive for driving a flexible disk inserted in said flexible disk drive, said method comprising:
    setting to zero both of (i) a current position counted value of a head current position track counter and (ii) a target position counted value of a head target position track counter when a power supply is turned on; and
    supplying a host system with a track 00 signal indicating that magnetic heads of said flexible disk drive are laid on an end most track position regardless of whether or not the flexible disk is inserted in the flexible disk drive.

2. The method as claimed in claim 1, wherein said method further comprises:
    prohibiting a special seek operation when a step signal is not supplied from said host system and when said flexible disk is not inserted in said flexible disk drive; and
    carrying out said special seek operation when said step signal is not supplied from said host system and when said flexible disk is inserted in said flexible disk drive.

3. The method as claimed in claim 2, wherein said method further comprises:
    when said step signal is supplied to said host system and when said flexible disk is not inserted in said flexible disk drive, (i) prohibiting said special seek operation, (ii) making said head target position track counter operate in response to said step signal although said magnetic heads are not actually operated, and (iii) supplying said host system with the track 00 signal indicating that said magnetic heads are not laid on said most end track position; and
    when said step signal is supplied to said host system and when said flexible disk is inserted in said flexible disk drive, (i) carrying out said special seek operation, (ii) making said magnetic heads automatically seek so that the current position counted value of said head current position track counter is equal to the target position counted value of said head target position track counter, and (iii) supplying said host system with the track 00 signal indicating that said magnetic heads are not laid on said most end track position.

4. The method as claimed in claim 3, wherein said method further comprises:
    when said step signal is supplied from said host system after said special seek operation and when said flexible disk is inserted in said flexible disk drive, carrying out a seek operation; and
    when said step signal is supplied from said host system after said special seek operation and when said flexible disk is inserted in said flexible disk drive, (i) prohibiting said seek operation until said flexible disk is inserted in said flexible disk drive, (ii) making said head target position track counter operate in response to said step signal although said magnetic heads are actually not operated, and (iii) making said magnetic heads automatically seek so that the current position counted value of said head current position track counter is equal to the target position counted value of said head target position track counter when said flexible disk is inserted in said flexible disk drive.

* * * * *